Sept. 4, 1923.
L. A. RUSSELL
1,467,196
COMBINED DRIVING AND STEERING GEAR
Filed June 12, 1920   3 Sheets-Sheet 1
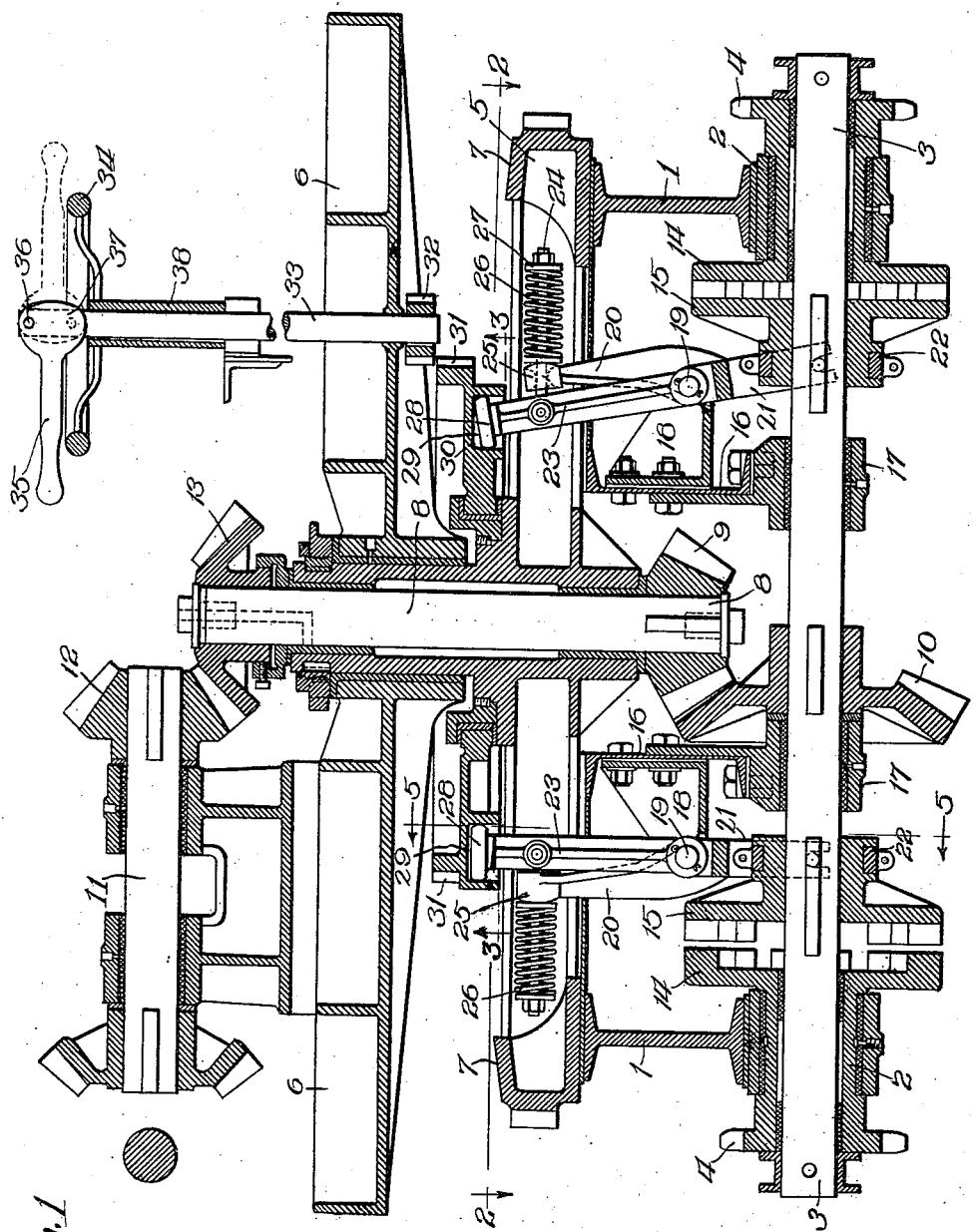

Sept. 4, 1923.
L. A. RUSSELL
1,467,196
COMBINED DRIVING AND STEERING GEAR
Filed June 12, 1920  3 Sheets-Sheet 2
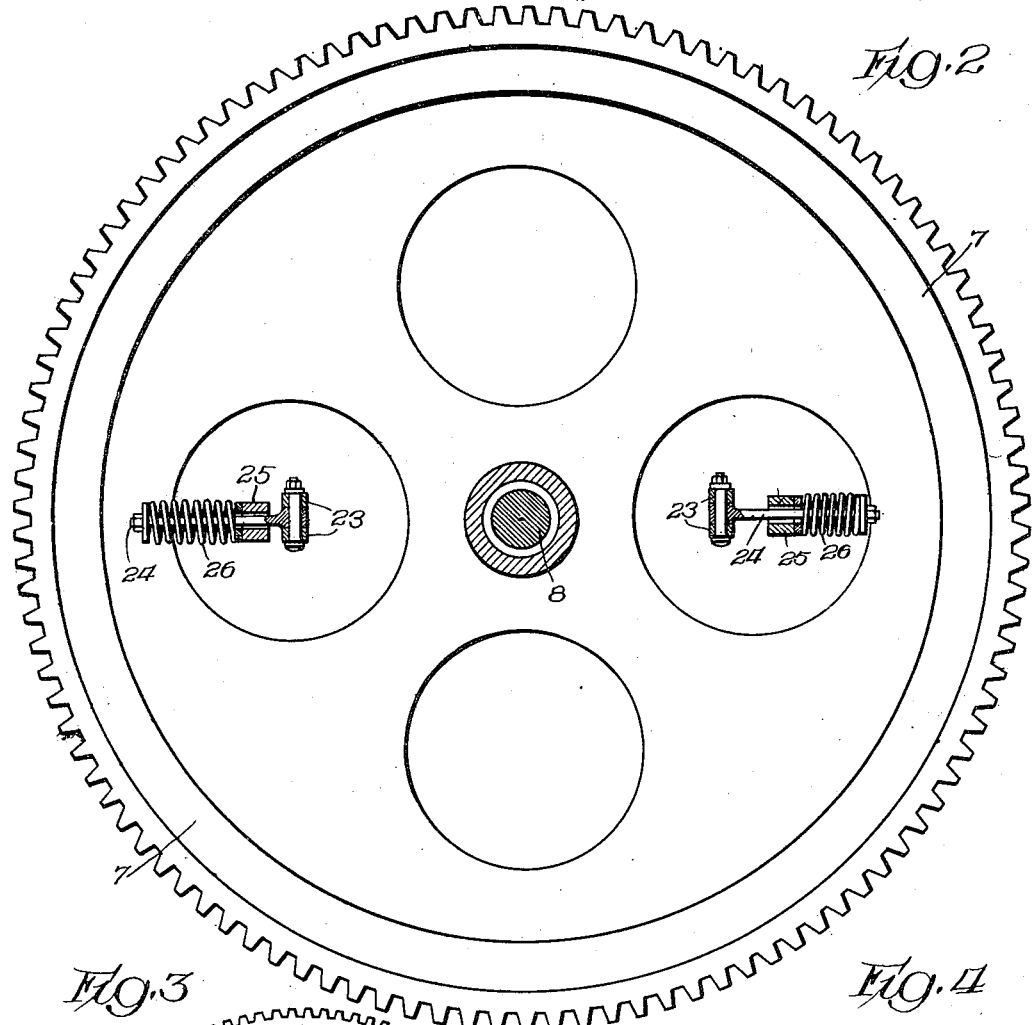
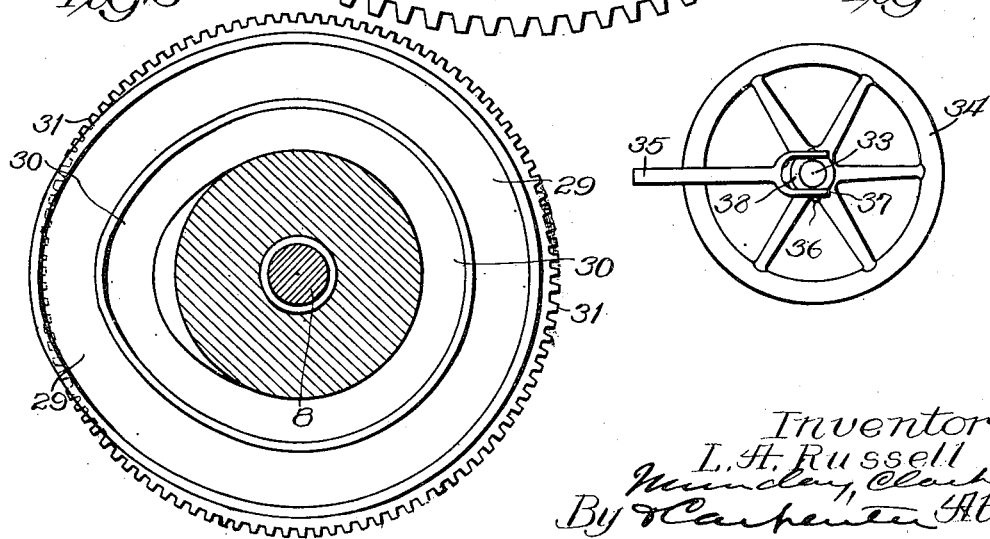
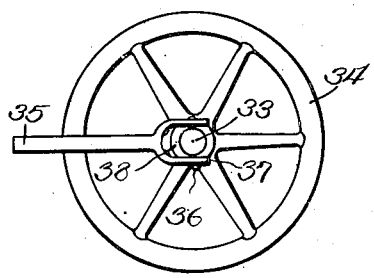

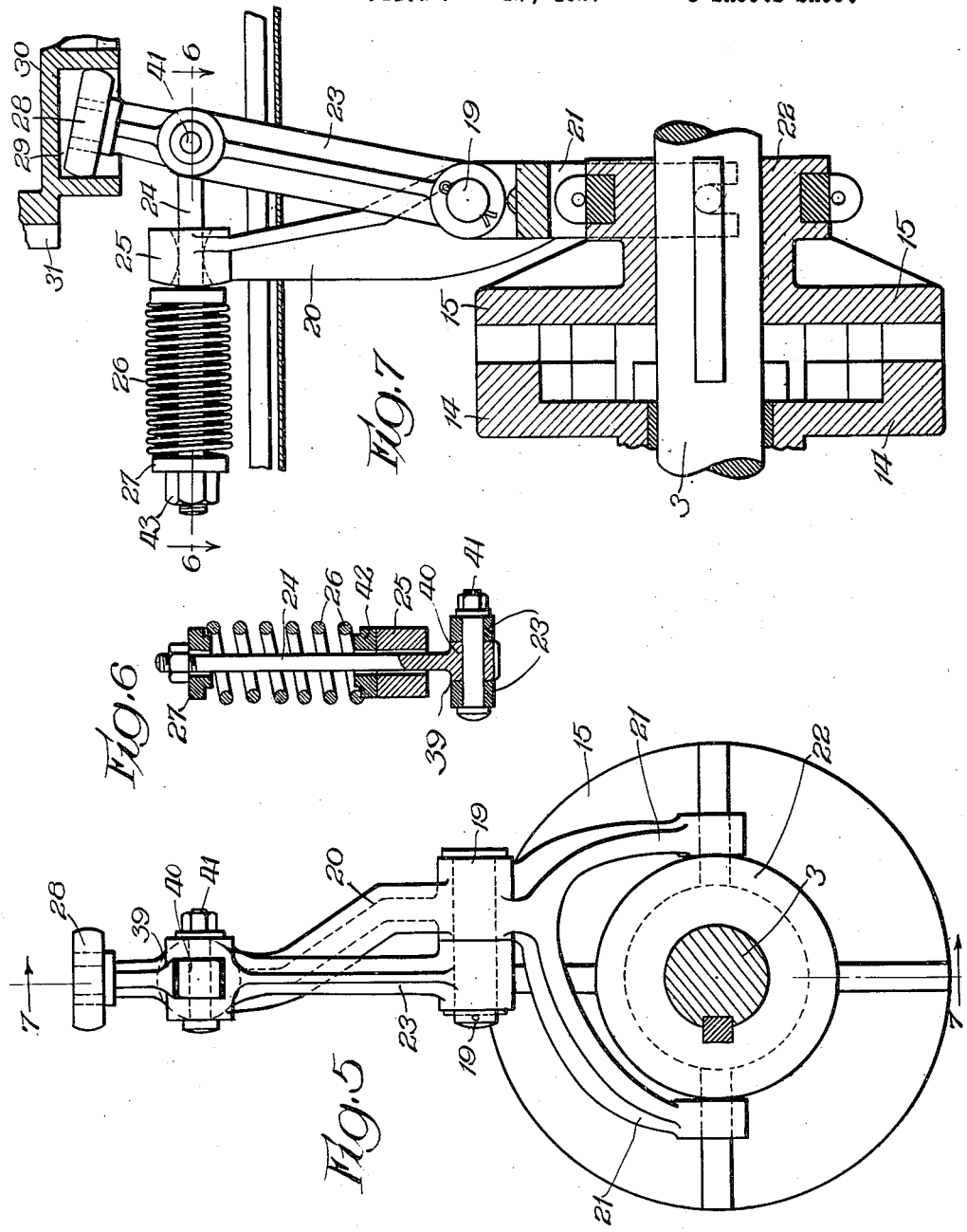

Patented Sept. 4, 1923.

1,467,196

UNITED STATES PATENT OFFICE.

LESLIE A. RUSSELL, OF MUSKEGON, MICHIGAN, ASSIGNOR TO F. C. AUSTIN MACHINERY COMPANY, OF CHICAGO, ILLINOIS, A CORPORATION OF ILLINOIS.

COMBINED DRIVING AND STEERING GEAR.

Application filed June 12, 1920. Serial No. 388,532.

*To all whom it may concern:*

Be it known that I, LESLIE A. RUSSELL, a citizen of the United States, residing in Muskegon, in the county of Muskegon and State of Michigan, have invented a new and useful Improvement in Combined Driving and Steering Gears, of which the following is a specification.

This invention relates to combined steering gear and driving mechanism for tractors or other self-propelled vehicles. In a steering gear and driving mechanism of this character, the transmission of power is controlled to discontinue the operation of the traction device at either side of the vehicle, so that the traction device which remains in operation will cause the vehicle to turn to the right or the left, or to travel in a circle, depending upon which device is stopped and which one is allowed to remain in operation. The invention relates more especially to tractors or self-propelled vehicles of this kind in which clutches are employed for controlling the transmission of power to the traction devices at opposite sides of the vehicle, and in which the steering gear comprises means for controlling said clutches.

Generally stated, therefore, the object of the invention is to provide a novel and improved construction whereby said clutches are controlled by steering gear connections of a simple and reliable character, and in a more satisfactory manner than heretofore, so that there will be less danger of breakage than was true with certain constructions heretofore employed for this purpose.

It is also an object to provide certain details and features of construction and combinations tending to increase the general efficiency and the desirability of a combined steering gear and driving mechanism of this particular character.

To these and other useful ends the invention consists in matters hereinafter set forth and claimed, and shown in the accompanying drawings, in which—

Fig. 1 is a vertical transverse section of a combined steering gear and driving mechanism embodying the principles of the invention, showing the same applied to a turntable machine, such as some of the excavators in which the excavating apparatus is mounted upon a turn-table, the invention, in its more specific aspects relating more particularly to the said turn-table type of machine, as in a machine of this character it becomes a problem to satisfactorily control the driving mechanism from the rotatable or oscillatory body upon which the various instrumentalities of the machine, including the power plant, the different controls, etc., are carried.

Fig. 2 is a plan of the stationary bed or track of the turn-table, showing certain portions of the clutch control devices in section, the said section being taken substantially on line 2—2 in Fig. 1.

Fig. 3 is a horizontal section on line 3—3 in Fig. 1, looking upward in the direction indicated by the arrow.

Fig. 4 is a detail view of the hand wheel by which the steering gear is controlled, showing the hand lever by which the steering column is disconnected from the mechanism below when it is desired to rotate the body of the machine on the turn-table.

Fig. 5 is an enlarged vertical section on line 5—5 in Fig. 1.

Fig. 6 is a detail sectional view on line 6—6 in Fig. 7.

Fig. 7 is a vertical section on line 7—7 in Fig. 5.

As thus illustrated, the invention comprises a body frame composed of side beams or sills 1 provided with bearings 2 for the transverse shaft 3 which is provided with sprockets 4 from which the traction devices (not shown) are driven. The turn-table bed or track 5 is of any suitable character, and is supported by the beams or sills 1, in any suitable or desired manner, so that the traction devices support the weight thereof. The rotary or oscillatory turn-table body 6 which forms the main body frame of the machine, is supported by suitable wheels, (not shown) which travel on the circular track 7 of the turn-table bed 5, and the center of the turn-table is provided with a vertical shaft 8 provided at its lower end with a bevel pinion 9 which engages a bevel gear 10 keyed to the shaft 3 previously mentioned. Upon the turn-table body 6 a transverse or horizontal shaft 11 is mounted and provided with a bevel pinion 12 which engages the bevel gear 13 mounted on the upper end of the shaft 8, whereby the latter is driven from a power plant (not shown) located on the turn-table body 6, through the medium of the shaft 11, in any suitable or desired manner. Any known or approved means can be employed for shifting the turn-table about the vertical axis provided by the shaft 8, in the manner common to machines of this general type.

The previously mentioned sprockets 4, it will be seen, are loose on the shaft 3, but are rigid with the outer members 14 of the clutches, the inner members 15 of said clutches being splined on the shaft 3, whereby power is not transmitted from the latter to the sprockets 4 except when said clutches are closed. The lower body frame of the machine comprises the beams 16 which carry the bearings 17 that help to support the shaft 3, and which are provided with brackets 18 upon which are pivoted at 19 the controlling levers 20 which have their lower ends provided with prongs 21 to engage the hubs 22 of said splined or movable clutch members. The levers 23 are also pivoted at 19, and extend upwardly therefrom and are provided with hinged rods 24 which extend through the guides 25 at the upper ends of the levers 20, and which have coil springs 26 interposed between said guides and the washers 27 secured to the outer ends of said rods. With this arrangement, it will be seen, any movement of the lever 23 toward the shaft 8 will be communicated through the yielding coil spring 26 to the upper end of the lever 20, and will cause the latter to shift the splined clutch member into engagement with the outer clutch member, thereby closing the clutch. For this purpose, the upper end of each lever 23 is provided with a roller 28 for engagement with the cam groove 29 in the rotary cam member 30, which latter is mounted on the turn-table bed 5 to rotate about a vertical axis formed by the shaft 8, so that said cam groove will shift the levers 23 and thereby control the clutches. Said cam member 30 has its outer periphery provided with gear teeth 31 for engagement with the pinion 32 on the lower end of the vertical hand wheel shaft 33, which latter is mounted in suitable bearings on the oscillatory turn-table body 6 and provided at its upper end with a hand wheel 34 for the rotation thereof, so that by rotation of the pinion 32 around the teeth 31, the cam member 30 will be rotated to control the clutches. Said cam groove 29, it will be understood, is so formed that either one clutch is open or both clutches closed, the two clutches never being open at the same time; and, in this way, the driving power communicated from the shaft 8 to the shaft 3 is controlled to interrupt the transmission of power to either side of the machine, but never to both sides at the same time, whereby the driving power is controlled by the steering gear to operate either traction device while the other traction device remains stationary, thus causing the machine to turn to the right or the left.

The clutch members 14 and 15, it will be seen, at each side of the machine, combine to form a jaw clutch, and it sometimes happens in closing a clutch of this character, that the teeth of the splined member do not immediately enter the spaces between the teeth of the other member, but instead impinge upon the teeth of the latter, so that some relative rotation must take place before the two members interlock in the desired manner. Ordinarily, with some constructions, this would cause breakage, but by reason of the springs 26 there is no danger of this with the foregoing construction, for the spring of either clutch will yield and thus allow the lever 23 to move toward the shaft 8, while the lever 20 remains stationary; and thereafter, as soon as the teeth of the two clutch members interlock, the tension of the spring as it expands between the washer 27 and the guide 25 will throw the lever 20 into the position shown at the right in Fig. 1, and will thereby close the clutch. The two levers 20 and 23 are preferably formed and constructed as shown in Fig. 5, and together, in combination with the spring 26 allotted thereto, constitute a connection which is somewhat flexible, so to speak, in order to prevent breakage when the two clutch members fail to come together in the right way, and do not immediately interlock in the desired manner.

Thus it will be seen that the body 5 and the shaft 3 and the structural members 1 and 16, held together as they are, constitute a truck frame having a driving shaft, and it will be understood that this truck frame is supported by the traction devices (such as multi-pedal belts) in any suitable or desired manner. The said shaft 3 is embraced by the prongs 21 of the levers 20, each said lever thereby constituting a yoke which is pivoted at 19 on the truck frame to control the clutches, and the device or means thus provided for controlling the clutches have provisions, as explained, including the compression springs 26, for preventing breakage in closing the clutches.

The steering shaft 33 is movable up and down to permit disengagement of the pinion 32 from the gear teeth 31, when it is desired to rotate the turntable. This can be done in any suitable or desired manner. For example, as in other machines of this general type, the upper portion of the shaft may have a hand lever 35 pivoted thereon at 36 and formed with cams 37 to engage the upper end of the sleeve-like bearing 38 in which the shaft is supported for rotation. Thus, when the lever 35 is in the position shown in full lines in Fig. 1, the shaft 33 is raised and the pinion 32 is out of engagement with the gear teeth 31, but when the lever 35 is thrown over into the position shown in dotted lines, then the pinion 32 engages the gear teeth 31, and the steering gear mechanism is operative to control the driving gear mechanism to steer the machine to the right or the left, as previously explained.

The pivoted connection between the arm 23 and the rod 24 can be of any suitable character. As shown, this connection is formed by providing a recess 39 in the lever 23 for the head 40 of said rod. A bolt 41 is inserted through said head 40, and through the lever 23, (see Figs. 5 and 6), thereby to form the pivot. Of course, the opening in this guide 25 must be formed to permit the rod to tilt or rock therein. A washer may be interposed between the spring 26 and said guide. By tightening the nut 43 on the rod 24 the tension of the spring 26 can be regulated.

What I claim as my invention is:—

1. In driving and steering gear for motor driven vehicles, the combination of oppositely arranged clutches, one for each side of the vehicle, a truck frame on which said clutches are supported, a turn-table body supported on the truck frame to turn about a vertical axis, power transmitting instrumentalities for communicating power to said clutches from a source on said body and through means rotatable about said axis thereof to drive the vehicle, a cam mounted to rotate about said axis, mechanism supported on said truck frame and having means for engaging said cam to control said clutches, having provisions to prevent breakage from the closing of the clutches, and steering means on said body to rotate said cam.

2. A structure as specified in claim 1, said mechanism including pivoted levers having their lower ends connected to said clutches and their upper ends provided with said means for engaging the cam, said provisions comprising a compression spring for each lever.

3. A structure as specified in claim 1, said cam being disposed between the truck frame and said body, and said steering means including gear teeth rigid with said cam and a pinion for engaging said gear teeth, said mechanism comprising rollers, and said cam having a groove for said rollers.

4. A structure as specified in claim 1, there being a horizontal shaft extending through said clutches, and said mechanism including pivoted yokes which extend downward from said cam to said clutches, said shaft extending between the lower ends of each yoke, said provisions comprising a compression spring for yieldingly operating each yoke.

5. In combined driving and steering mechanism, the combination of a truck frame provided with a bearing, a cam mounted on said bearing to rotate about a vertical axis, a turn-table which is rotatable about said axis, means for transmitting driving power through said axis, mechanism operated by said cam to control the transmission of driving power, having yielding means to prevent breakage in closing the clutches, and steering means for rotating said cam.

6. A structure as specified in claim 5, said mechanism comprising a pair of pivoted levers having their upper ends provided with means for engaging said cam, and having their lower ends connected to control the transmission of driving power, said yielding means comprising a spring for the upper end of each lever.

7. In a combined steering gear and driving mechanism for self-propelled vehicles, the combination of power transmitting mechanism for driving the vehicle, devices for controlling said mechanism to steer the vehicle, having yielding provisions to prevent breakage in the operation thereof, and means including a rotatable cam to control said devices.

8. A structure as specified in claim 7, said devices comprising a set of pivoted levers for each side of the vehicle, and said provisions comprising a spring for each set of levers, whereby said levers are yieldingly maintained in normal relation to each other.

9. A structure as specified in claim 7, said provisions comprising a compression coil spring for each side of the vehicle.

10. A structure as specified in claim 7, said mechanism comprising a clutch for each side of the vehicle, and said provisions including a controlling spring allotted to each clutch.

11. A structure as specified in claim 7, in combination with a turn-table operating about a vertically disposed axis, said means including a cam which is rotatable about said axis to control said devices, and said provisions comprising a spring at each side of said cam.

12. A structure as specified in claim 1, said provisions including means to adjust and regulate the action thereof.

13. A structure as specified in claim 1, said provisions including springs, and having nuts to regulate the tension thereof.

14. In a driving and steering mechanism for motor driven vehicles, the combination of a driving shaft, oppositely acting clutches arranged upon said shaft, traction means located adjacent each end of said shaft, a rotary body above said driving shaft, rotatable cam mounted on said body and clutch control levers actuated by said cam, said clutch control levers having their upper ends confined within channeled grooves in said cam and being moved positively in each direction by the cam for steering.

15. In a combined driving and steering mechanism for self-propelled vehicles, the combination of a drive shaft, traction actuating members at the ends thereof, clutch members for individually connecting said traction actuating members with said drive shaft, clutch levers for manipulating said clutch members for steering, said levers including a pivoted arm engaging one of said clutch members and a second arm pivoted on the axis of said first-mentioned arm, spring means yieldingly forcing said arms toward each other, vertically disposed power transmitting means for operating said drive shaft, and a cam rotatable about said power transmitting means for moving said second-mentioned arm upon its pivot to control the clutch through the instrumentality of said first-mentioned arm and spring.

LESLIE A. RUSSELL.